United States Patent Office 3,763,193
Patented Oct. 2, 1973

3,763,193
ANTHRAQUINONE DYESTUFFS
Hederich Volker, Cologne-Deutz, Gehrke Gunter, Cologne-Flittard, and Bein Hans-Samuel, Burscheid, Germany, assignors to Bayer Aktiengesellschaft, Leverkusen, Germany
No Drawing. Continuation of abandoned application Ser. No. 550,894, May 18, 1966. This application Feb. 17, 1971, Ser. No. 116,254
Claims priority, application Germany, May 24, 1965, F 46,135
Int. Cl. C09b 1/52
U.S. Cl. 260—373                                    9 Claims

ABSTRACT OF THE DISCLOSURE

Anthraquinone dyestuffs useful in the dyeing of cellulose esters, polyamides, or polyester fibre materials containing from two to four auxochromes in the alpha position and an acyloxy group in the beta position, said acyloxy group being preferably a sulphonoxy group containing an aryl, alkyl, or dialkylamino substituent.

---

This application is a continuation of Ser. No. 550,894, filed May 18, 1966, now abandoned.

The present invention relates to anthraquinone dyestuffs containing two to four auxochromous substituents in the α-position and an acyloxy group in the β-position.

It has been found that such compounds are very well suited for dyeing synthetic fibres.

The anthraquinone dyestuffs may contain, as auxochromous substituents, the auxochromous substituents customary for dispersion dyestuffs, e.g. amino, alkylamino, arylamino, acylamino, hydroxy, alkoxy, aryloxy, alkylmercapto or arylmercapto groups. The acyloxy group is an aliphatic or aromatic carboxylic or carbonic acid ester, preferably an aliphatic or aromatic sulphonic acid ester or a N,N-dialkylamino-sulphonic acid ester. Aliphatic radicals or alkyl radicals are chiefly lower alkyl radicals (with 1 to 6 carbon atoms). The aromatic radicals are preferably phenyl radicals which may also be substituted e.g. by halogen atoms, lower alkyl or alkoxy groups.

The new dyestuffs according to the present invention may be produced from the appropriate anthraquinone-β-hydroxy compounds by acylation with a reactive derivative of an aliphatic or aromatic carboxylic or sulphonic acid or with a halocarbonic acid ester. The acylation can be carried out in organic solvents, preferably pyridine, or an aqueous medium in the presence of acid-binding agents and at temperatures of between —20° to +100° C., preferably between 0–30° C.

Examples of anthraquinone-β-hydroxy compounds are the following:

1,2-dihydroxy-4-amino-anthraquinone,
1,3-dihydroxy-4-amino-anthraquinone,
1,2-dihydroxy-4-cyclohexylamino-anthraquinone,
1,2-dihydroxy-4-anilino-anthraquinone,
1,2-dihydroxy-4-toluidino-anthraquinone,
1,2-dihydroxy-4-anisidino-anthraquinone,
1,2-dihydroxy-4-(hydroxyanilino)-anthraquinone,
1,2-dihydroxy-4-(chloroanilino)-anthraquinone,
1,2-dihydroxy-4-(o,o'-dimethylanilino))-anthraquinone,
1,2-dihydroxy-4-(o,o'-diethyl-p-methyl-anilino)-anthraquinone,
1,2-dihydroxy-5,8-di-anilino-anthraquinone,
1,2-dihydroxy-5,8-di-toluidino-anthraquinone,
1,2,4-trihydroxy-anthraquinone,
1,2,8-trihydroxy-anthraquinone,
1-amino-2-hydroxy-4-mesylamino-anthraquinone,
1-amino-2-hydroxy-4-benzene-sulphamidoanthraquinone,
1-amino-2-hydroxy-4-tosylamino-anthraquinone,
1-amino-2-hydroxy-4-tosylamino-6-methoxy-anthraquinone,
1,4-diamino-2-hydroxy-6-methoxy-anthraquinone,
1-amino-2-hydroxy-4-thiophenoxy-anthraquinone,
1-amino-2-hydroxy-4-(methylthiophenoxy)-anthraquinone,
1-amino-2-hydroxy-4-(p-tert.butylthiophenoxy)-anthraquinone,
1-amino-2-hydroxy-4-(chlorothiophenoxy)-anthraquinone,
1,4-di-anilino-2-hydroxy-anthraquinone,
1,4-toluidino-2-hydroxy-anthraquinone,
1,2,5-trihydroxy-4,8-diamino-anthraquinone,
1,2,5-trihydroxy-4,8-diamino-6-bromo-anthraquinone,
1,2,5-trihydroxy-4,8-diamino-7-bromo-anthraquinone,
1,2,5-trihydroxy-4,8-diamino-6-chloro-anthraquinone,
1,2,5-trihydroxy-4,8-diamino-7-chloro-anthraquinone,
1,2,5-trihydroxy-4,8-diamino-6-(p-methoxyphenyl)-anthraquinone,
1,2,8-trihydroxy-4,5-diamino-anthraquinone,
1,6-dihydroxy-4,5,8-triamino-anthraquinone,
1,2-dihydroxy-4,8-diamino-anthraquinone,
1,4,8-triamino-2-hydroxy-anthraquinone,
1,4-diamino-2-hydroxy-anthraquinone,
1-amino-2-hydroxy-4-anilino-anthraquinone,
1-amino-2-hydroxy-4-toluidino-anthraquinone,
1-amino-2-hydroxy-4-anisidino-anthraquinone,
1-amino-2-hydroxy-4-chloroanilino-anthraquinone,
1-amino-2-hydroxy-4-hexahydroanilino-anthraquinone,
1-N-methylamino-2-hydroxy-4-anilino-anthraquinone, and
1-,N,N-dimethylamino-2-hydroxy-4-anilino-anthraquinone.

Acylating agents which may be used are, for example, the halides and anhydrides of acetic acid, propionic acid, butyric acid, methoxy acetic acid, phenylacetic acid, benzoic acid, toluic acid, chlorobenzoic acid, naphthoic acid and furoic acid, also chlorocarbonic acid methyl ester, chlorocarbonic acid ethyl ester, chlorocarbonic acid phenyl ester, methane-sulphochloride, ethane-sulphochloride, propane-sulphochloride, butane-sulphochloride, benzene-sulphochloride, toluene-sulphochloride, chlorobenzene-sulphochloride, dichlorobenzene - sulphochloride, nitrobenzene-sulphochloride, naphthalene-sulphochloride, chlorobenzothiazole-sulphochloride, N,N-dimethylamino-sulphochloride and N,N-diethylamino-sulphochloride.

As shown in the disclosure the dyestuffs are anthraquinone dyestuffs which contain from 2–4 auxochromes in the alpha position and an acyloxy group in the beta position wherein the alpha and beta positions of the anthraquinone nucleus which do not contain auxochromes or an acyloxy group contain a member selected from the group consisting of hydrogen, bromine, chlorine and methoxyphenyl; said auxochromes being selected from the group consisting of amino, alkylamino, phenylamino, substituted phenylamino, acylamino, hydroxy, phenylmercapto, and cyclohexylamino wherein the substituted phenyl group in said auxochromes contains substituents selected from the group consisting of halogen, hydroxy, alkyl, alkoxy, and alkylsulfonyloxy groups and wherein the alkyl group in said auxochrome contains one to six carbon atoms said acyloxy group being a sulfonyloxy group selected from the group consisting of alkyl-, β-chloroethyl, benzene-, substituted benzene-, naphthalene-, benzyl-, chlorobenzothiazolyl-, or N,N-dialkylaminosulfonyloxy wherein the substituents on said benzene sulfonyloxy group are selected from the group consisting of methyl, chloro, or nitro groups and wherein the alkyl group in said acyloxy group contains from 1 to 6 carbon atoms. The preferred auxochromes being at least one each of the hydroxy and amino derivatives.

As acid-binding agents there may be used, e.g. trimethylamine, triethylamine, tripropylamine, tributylamine, alkali metal hydroxides or carbonates, and as organic solvents, e.g. pyridine, methylpyridine, dimethylpyridine, dimethyl-aniline, quinoline, N-methylpyrrolidone, dimethyl formamide, o-dichlorobenzene, or nitrobenzene.

It is advantageous to convert the dyestuffs into a finely divided state by customary methods, e.g. by precipitation, grinding or kneading, in the presence of dispersing agents. The conventional dyeing auxiliaries may also be added while carrying out the dyeing. For dyeing the various fibre materials, e.g. of cellulose esters, polyamides or chiefly of polyterephthalic acid esters, the dyestuffs are applied according to the usual dyeing methods.

Cellulose-2½ acetate, for example, is dyed in the presence of Marseille soap at 60 to 80° C. Cellulose triacetate and polyamide fibres may be dyed at 00° C. When dyeing polyterephthalic acid ester fibres, the customary dyeing accelerators may be added, or the dyeing can be carried out at 120 to 130° C. under pressure. The dyeings on fibres of polyterephthalic acid ester can also be fixed by a brief heat treatment at 190 to 220° C.

On the above-mentioned fibres there are obtained clear blue, red, violet, orange and green dyeings of very good fastness to light and washing and outstanding fastness to sublimation and thermofixing. In some cases it is expedient to use mixtures instead of pure dyestuffs, since the mixtures have sometimes a better affinity.

In comparison with the dyeings obtained with the corresponding β-hydroxy compounds, the dyestuffs according to the invention are characterised by a marked improvement of the fastness to light, sublimation and thermofixing.

The following examples are given for the purpose of illustrating the invention and should not be regarded as limiting the same; the parts are parts by weight.

EXAMPLE 1

2 parts triethylamine are added to a solution of 3.5 parts 1,2-dihydroxy-4-amino-anthraquinone in 35 parts anhydrous pyridine. 3 parts p-toluene-sulphochloride, dissolved in 5 parts pyridine, are then added dropwise at 0 to 5° C. over half an hour, while stirring. After further stirring for one hour at the same temperature, 30 parts methanol are added. The red dyestuff which precipitates in the cold is filtered off under suction, washed with methanol and water and dried. 5 parts 1-hydroxy-2-p-tosyloxy-4-amino-anthraquinones are obtained which, when recrystallised from pyridine, melts at 249 to 251° C.

100 parts polyester fibres (polyethylene terephthalate) are dyed in 3000 parts water for one hour at 125 to 130° C. under pressure with 1 part of the dyestuff converted into a finely divided state according to conventional methods. An intense bluish-red dyeing of very good fastness to light and sublimation is obtained.

EXAMPLES 2-12

In the same manner as that described in Example 1, the dyestuffs set out in Table 1 are obtained, which yield the shades specified on polyester materials.

TABLE 1

| Example | Dyestuff | Shade |
|---|---|---|
| 2 | 1-hydroxy-3-(p-chlorobenzene-sulphonyloxy)-4-amino-anthraquinone. | Bluish-red. |
| 3 | 1-hyrdoxy-3-benzene-sulphonyloxy-4-amino-anthraquinone. | Do. |
| 4 | 1-hydroxy-3-mesyloxy-4-amino-anthraquinone. | Do. |
| 5 | 1-hydroxy-3-benzylsulphonyloxy-4-amino-anthraquinone. | Do. |
| 6 | 1-hydroxy-3-p-tosyloxy-4-amino-anthraquinone. | Do. |
| 7 | 1-hydroxy-2-o-tosyloxy-4-amino-anthraquinone. | Do. |
| 8 | 1-hydroxy-2-(m-chlorobenzene-sulphonyloxy)-4-amino-anthraquinone. | Do. |
| 9 | 1-hydroxy-2-ethylsulphonyloxy-4-amino-anthraquinone. | Do. |
| 10 | 1-hydroxy-2-benzyl-sulphonyloxy-4-amino-anthraquinone. | Do. |
| 11 | 1-hydroxy-2-(1'-naphthalene-sulphonyloxy)-4-amino-anthraquinone. | Do. |
| 12 | 1-hydroxy-2-(2'-naphthalene-sulphonyloxy)-4-amino-anthraquinone. | Do. |

EXAMPLE 13

(a) 3.5 parts 1,2-dihydroxy-4-anilino-anthraquinone are dissolved in 40 parts technical pyridine with the addition of 2.5 parts triethylamine. 1.75 parts p-tosyl chloride, dissolved in 5 parts pyridine, are added dropwise over half an hour at 0 to 5° C. The reaction mixture is further stirred for half an hour, and mixed with 80 parts methanol, then the precipitated violet needles are filtered off under suction, washed with methanol and water and dried at 90° C. There are obtained 4.5 parts 1-hydroxy-2-p-tosyloxy-4-anilino-anthraquinone, which can be recrystallised from pyridine and melts at 159 to 160° C.

A fabric of polyester fibres (polyethylene terephthalate) is impregnated on the foulard with a liquor which contains 20 g. per litre dyestuff of the above constitution which has previously been converted into a finely divided state in the presence of dispersing agents. The fabric is squeezed off to a weight increase of 70% and dried at 100° C. The fabric is then subjected to a hot air treatment at 190 to 210° C. for 60 seconds to fix the dyeing, rinsed, washed with hot water and dried. An intense violet dyeing of excellent fastness to light, sublimation and rubbing is obtained.

(b) When, in an analogous manner to that described in Example 13(a), 1,2-dihydroxy-4-anilino-anthraquinone is reacted with β-naphthalene-sulphochloride, instead of with p-tosylchloride, 1 - hydroxy-2-(β-naphthalene-sulphonyloxy)-4-anilino-anthraquinone is obtained which also yields on polyester fibres a clear violet dyeing of excellent fastness properties.

EXAMPLE 14

5 parts 1,2-dihydroxy-4-p-anisidino-anthraquinone are dissolved in 50 parts N-methyl-pyrrolidone and mixed with 2.5 parts triethylamine. There are added dropwise at 0° C. within one hour 3 parts benzene-sulphochloride, dissolved in 5 parts N-methyl-pyrrolidone. The reaction mixture is stirred for half an hour at 0° C. and 100 parts methanol are added, and the precipitated crystals are filtered off under suction and washed with methanol and water. After dyring, 6.4 parts 1-hydroxy-2-benzene-sulphonyloxy - 4 - p - anisidino-anthraquinone are obtained. After recrystallisation from pyridine, crystals with a metallic lustre of melting point 207 to 209° C. are obtained.

100 parts polyester fibres (polyethylene terephthalate) are dyed in 3000 parts water at 125 to 130° C. under pressure for one hour with 1 part of the dyestuff previously converted into a finely divided state according to the usual methods. An intense reddish-blue dyeing of very good fastness to light and sublimation is obtained.

EXAMPLE 15

5 parts 1,2-dihydroxy-4-p-anisidino-anthraquinone are dissolved in 50 parts nitrobenzene while warming the mixture. After the addition of 2.2 parts triethylamine it is cooled to room temperature. 2.5 parts p-tosylchloride in 5 parts nitrobenzene are added dropwise with stirring over 45 minutes. The reaction mixture is kept at room temperature for one hour, diluted with 100 parts methanol, and the precipitated crystals filtered off under suction. After washing with methanol and water and after drying, 6.5 parts 1-hydroxy-2-p-tosyloxy-4-p-anisidino-anthraquinone are obtained, which is recrystallised from pyridine and melts at 186 to 187° C.

A fabric of polyester fibres (polyethylene terephthalate) is impregnated on the foulard with a liquor which contains, per litre, 20 g. of the above dyestuff previously converted into a finely divided state. After squeezing off the fabric to a weight increase of 70%, it is dried at 100° C. To fix the dyeing the fabric is subsequently subjected to a treatment with hot air at 190 to 210° C. for 60 seconds, then rinsed, washed with hot water and dried. An intense reddish-blue dyeing of very good fastness to sublimation, rubbing and light is obtained.

EXAMPLE 16

2.5 parts 1,2-dihydroxy - 4 - anilino - anthraquinone are suspended in a mixture of 80 parts water and 20 parts pyridine, and dissolved by the addition of 10 parts of a 2 N sodium hydroxide solution. 1.5 parts p-tosylchloride in 3 parts pyridine are added dropwise at room temperature over 15 minutes. The reaction mixture is stirred at room temperature for 2 hours, whereby blue needles are slowly precipitated, subsequently it is heated to boiling temperature, diluted with 100 parts water and filtered off under suction. The residue is washed with a 2 N sodium hydroxide solution, treated with 2 N hydrochloric acid and dried. There are obtained 2.5 parts of a dyestuff which is identical with that prepared according to Example 13a and yields on polyester materials the dyeings which are there indicated.

EXAMPLES 17 TO 41

In the same manner as that described in Examples 13 to 16, the dyestuffs set out in Table II are obtained, which yield the specified shades on polyester materials.

| Example | Dyestuff | Shade |
| --- | --- | --- |
| 17 | 1-hydroxy-2-mesyloxy-4-anilino-anthraquinone. | Reddish-blue. |
| 18 | 1-hydroxy-2-(β-chloroethylsulphonyloxy-4-anilino-anthraquinone. | Do. |
| 19 | 1-hydroxy-2-N,N-dimethylamino-sulphonyloxy-4-anilino-anthraquinone. | Do. |
| 20 | 1-hydroxy-2-(1'-naphthalene-sulphonyl-oxy)-4-anilino-anthraquinone. | Do. |
| 21 | 1-hydroxy-2-(p-chlorobenzene-sulphonyl-oxy)-4-p-toluidino-anthraquinone. | Do. |
| 22 | 1-hydroxy-2-(m-chlorobenzene-sulphonyl-oxy)-4-m-toluidino-anthraquinone. | Do. |
| 23 | 1-hydroxy-2-benzene-sulphonyloxy-4-cyclohexylamino-anthraquinone. | Blue-violet. |
| 24 | 1-hydroxy-2-benzylsulphonyloxy-4-cyclohexylamino-anthraquinone. | Do. |
| 25 | 1-hydroxy-2-mesyloxy-4-cyclohexylamino-anthraquinone. | Do. |
| 26 | 1-hydroxy-2-(N,N-dimethylaminosul-phonyloxy)-4-cyclohexylamino-anthraquinone. | Do. |
| 27 | 1-hydroxy-2-(2'-chlorobenzothiazolesul-phonyloxy)-4-cyclohexylamino-anthraquinone. | Do. |
| 28 | 1-hydroxy-2-p-tosyloxy-4-(o,o'-diethyl-p-methyl-anilino-)-anthraquinone. | Violet. |
| 29 | 1-hydroxy-2-p-tosyloxy-4-(o,o'-dimethyl-anilino)-anthraquinone. | Do. |
| 30 | 1-hydroxy-2-benzene-sulphonyloxy-4-(o,o'-dimethyl-anilino)-anthraquinone. | Do. |
| 31 | 1-hydroxy-2-mesyloxy-4-(p-mesyloxy-anilino-)-anthraquinone. | Reddish-blue. |
| 32 | 1-hydroxy-2-p-tosyloxy-4-(m-chloro-anilino)-anthraquinone. | Do. |
| 33 | 1-hydroxy-2-p-tosyloxy-5,8-di-p-toluidino-anthraquinone. | Green. |
| 34 | 1,4-dihydroxy-2-benzene-sulphonyloxy-anthraquinone. | Orange. |
| 35 | 1,4-dihydroxy-2-p-tosyloxy-anthraquinone | Do. |
| 36 | 1,8-dihydroxy-2-(p-chlorobenzene-sulphonyloxy)-anthraquinone. | Yellow. |
| 37 | 1-amin-2-mesyloxy-4-p-tosylamino-anthraquinone. | Yellowish-red. |
| 38 | 1-amino-2-p-tosyloxy-4-p-tosylamino-anthraquinone. | Do. |
| 39 | 1-amino-2-p-tosyloxy-4-p-tosylamino-6-methoxy-anthraquinone. | Bluish-red. |
| 40 | 1,4-diamino-2-p-tosyloxy-6-methoxy-anthraquinone. | Red-violet. |
| 41 | 1,4-di-p-toluidino-2-p-tosyloxyanthra-quinone. | Green. |

One part of the dyestuff obtained according to Example 17 is converted into a finely divided state, and used to dye 200 parts polyethylene terephthalate fibres at boiling temperature for 120 minutes in 4000 parts water in the presence of 15 parts o-cresotic acid methyl ester as carrier. A clear intense reddish-blue dyeing of very good fastness to light and sublimation is obtained.

EXAMPLE 42

9 parts 1-amino-2-hydroxy-4-(o-methyl - thiophenoxy)-anthraquinone are dissolved in 100 parts pyridine and mixed with 11 parts triethylamine. 6 parts p-tosylchloride, dissolved in 10 parts pyridine, are then added dropwise at room temperature over 30 minutes. Red needles precipitate on the addition of 20 parts water. After suction-filtration and washing with methanol and water, the product is dried. 10.5 parts 1-amino-2-p-tosyloxy-4-(o-methyl-thiophenoxy)-anthraquinone are obtained. After recrystallisation from pyridine, the dyestuff crystallises in the form of needles of melting point 205 to 206° C.

With one part of this dyestuff previously converted into a finely divided state, 100 parts polyester fibres (obtained by polycondensation of terephthalic acid and dimethylol-cyclohexane) are dyed, by means of the customary auxiliary agents, in 3000 parts water at 125 to 130° C. under pressure for one hour. A clear bluish-red dyeing of good fastness properties is obtained.

EXAMPLES 43 TO 50

In the same way as that described in Example 42, the dyestuffs set out in Table III are obtained with the use of the appropriate starting materials. Their dyeings on polyester materials yield the shades specified.

TABLE III

| Example | Dyestuff | Shade |
| --- | --- | --- |
| 43 | 1-amino-2-benzene-sulphonyloxy-4-thio-phenoxy-anthraquinone. | Bluish-red. |
| 44 | 1-amino-2-p-tosyloxy-4-(m-methylthio-phenoxy)-anthraquinone. | Do. |
| 45 | 1-amino-2-(p-chlorobenzene-sulphonyl-oxy)-4-(p-methylthiophenoxy)-anthra-quinone. | Do. |
| 46 | 1-amino-2-benzylsulphonyloxy-4-thio-phenoxy-anthraquinone. | Do. |
| 47 | 1-amino-2-mesyloxy-4-thiophenoxy-anthraquinone. | Do. |
| 48 | 1-amino-2-mesyloxy-4-(p-methoxythio-phenoxy)-anthraquinone. | Do. |
| 49 | 1-amino-2-propylsulphonyloxy-4-(o-methylthiophenoxy)-anthraquinone. | Do. |
| 50 | 1-hydroxy-2-p-tosyloxy-4-thiophenoxy-anthraquinone. | Orange. |

EXAMPLE 51

(a) 43 parts 1,2,5-trihydroxy-4,8-diamino-anthraquinone are introduced into a mixture of 200 parts technical pyridine and 30 parts triethylamine. 30 parts p-tosylchloride, dissolved in 50 parts technical pyridine, are added dropwise at 0° C. The reaction mixture is further stirred at 0° C. for 1 hour, mixed with 150 parts methanol, and the precipitated needles filtered off with suction and washed with methanol and water. 55 parts 1,5-dihydroxy-4,8-diamino - 2 - p - tosyloxy-anthraquinone are obtained. After recrystallisation from pyridine, the dyestuff melts at 243 to 244° C.

The dyestuff is converted into a finely divided state with the use of the customary dispersing agents. A fabric of polyethylene terephthalate fibres is impregnated with a liquor which contains 20 gm./litre of the dyestuff thus treated in water, and subsequently squeezed to a 70% weight increase. It is then dried at 100° C. and the dyestuff fixed by a treatment with hot air at 190 to 210° C. for 60 seconds. After rinsing, washing with hot water and drying, a brilliant blue dyeing of outstanding fastness to sublimation and rubbing and very good fastness to light is obtained.

(b) If 1,2,5-trihydroxy-4,8-diamino-anthroquinone is reacted with β-naphthalene-sulphochloride, instead of with p-tosylchloride, then there is obtained in the same manner as that described in 51(a), 1,5-dihydroxy-4,8-diamino - 2 - (β-naphthalene-sulphonyloxy)anthraquinone which yields on polyester fibres a blue dyeing of very good fastness properties.

EXAMPLES 52 to 64

In a manner corresponding to that described in Example 51, dyestuffs are obtained with the use of the appropriate starting materials, which are set out in Table IV. They yield dyeings on materials of polyethylene terephthalate.

TABLE IV

| Example | Dyestuff | Shade |
|---|---|---|
| 52 | 1,5-dihydroxy-4,8-dimaino-2-benzenesulphonyl-oxy-anthraquinone. | Blue. |
| 53 | 1,5-dihydroxy-4,8-diamino-2-(p-chlorobenzene-sulphonyloxy)-anthraquinone. | Do. |
| 54 | 1,5-dihydroxy-4,8-diamino-2-benzylsulphonyloxy-anthraquinone. | Do. |
| 55 | 1,5-dihyrdoxy-4,8-diamino-2-mesyloxy-anthraquinone. | Do. |
| 56 | 1,5-dihydroxy-4,8-diamino-2-propylsulphonyloxy-anthraquinone. | Do. |
| 57 | 1,5-dihydroxy-4,8-diamino-2-(N-N-dimethyl-aminosulphonyloxy)-anthrquinone. | Do. |
| 58 | 1,5-dihydroxy-4,8-diamino-6-bromo-2-p-toxyloxy-anthraquinone. | Do. |
| 59 | 1,5-dihydroxy-4,8-diamino-7-bromo-2-p-tosyloxy-anthraquinong. | Do. |
| 60 | 1,5-dihydroxy-4,8-diamino-6-chloro-2-benzene-sulphonyloxy-anthraquinong. | Do. |
| 61 | 1,5-dihydroxy-4,8-diamino-7-chloro-2-benzene-sulphonyloxy-anthraquinone. | Do. |
| 62 | 1,8-dihydroxy-4,5-diamino-2-p-tosyloxy-anthraquinone. | Do. |
| 63 | 1,8-dihydroxy-4,5-diamino-2-benzene-sulphonyl-oxy-anthraquinone. | Do. |
| 64 | 1,5-dihydroxy-4,8-diamino-6-(p-methoxyphenyl)-2-p-tosyloxy-anthraquinone. | Do. |

One part of the dyestuff prepared according to Example 52 is converted into a finely divided state by the usual methods, and used to dye 100 parts of a polyamide fabric in 4000 parts water at 100° C. for one hour. The fabric is subsequently rinsed first warm, then cold, and dried. A clear greenish-blue dyeing of good fastness to washing and light is obtained.

EXAMPLE 65

7.2 g. 1,2-dihydroxy-4-p-anisidino-anthraquinone are dissolved in 40 parts anhydrous pyridine. 2.7 parts propionic anhydride, dissolved in 5 parts pyridine, are subsequently added dropwise, over one hour at room temperature. The reaction mixture is further stirred for 3 hours, mixed with 100 parts methanol, and the precipitated needles filtered off with suction. The yield of 1-hydroxy-4-p-anisidino-2-propionyloxy-anthraquinone which, after recrystallisation from pyridine, melts at 160 to 161° C. amounts to 7.8 parts.

With one part of the dyestuff, converted into a finely divided state by the usual methods, 100 parts fibres of polyethylene terephthalate are dyed in 3000 parts water for one hour at 125–130° C. under pressure. A clear intense reddish-blue dyeing of very good fastness properties is obtained.

EXAMPLE 66

14 parts 1,2,5-trihydroxy-4,8-diamino-anthraquinone are dissolved in 100 parts pyridine. 7.5 parts benzoic anhydride in 20 parts pyridine are added dropwise at 30° C. within 1 hour. The reaction mixture is further stirred for 1 hour, cooled to 10–15° C. and mixed dropwise with 5 parts propionic anhydride in 20 parts pyridine over 1 hour. Stirring is then continued at 10–15° C. until no more starting material is present, the reaction mixture is poured on to 1000 parts ice water, the precipitate is filtered off with suction and washed with water. 16 parts of a blue dyestuff mixture is obtained.

A dyebath is prepared with one part of this dyestuff mixture converted into a finely divided state with the use of the usual auxiliary agents, 6 parts fatty alcohol sulphonate and 3000 parts water, and 100 parts cellulose triacetate fibres are dyed in this bath at 100° C. for 1 hour. A clear, intense reddish-blue dyeing of good fastness to washing, thermofixing and light is obtained.

EXAMPLE 67

3.5 parts 1,2-dihydroxy-4-amino-anthraquinone are dissolved in 40 parts technical pyridine. After the addition of 2.1 parts triethylamine, 1.8 parts benzoyl chloride in 10 parts pyridine are added dropwise at 0–5° C. over a half hour. The reaction mixture is further stirred at 0–5° C. for 1 hour, mixed with 50 parts methanol and 20 parts water, and the precipitate formed is filtered off with suction. There are obtained 4 parts 1-hydroxy-4-amino-2-benzoyloxyanthraquinone which, after recrystallisation from pyridine, melts at 241–242° C.

With one part of this dyestuff previously converted into a finely divided state, 100 parts polyester fibres (polyethylene terephthalate) are dyed at boiling temperature for 120 minutes in 4000 parts water in the presence of 15 parts o-cresotic acid methyl ester as carrier. An intense bluish-red dyeing of very good fastness properties is obtained.

EXAMPLE 68

5 parts 1,2-dihydroxy-4-anilino-anthraquinone are dissolved in 50 parts technical pyridine. The reaction mixture is treated with 2.8 parts triethylamine, and a solution of 4 parts chlorocarbonic acid ethyl ester in 10 parts acetone is added dropwise at 0–5° C., with vigorous stirring, over half an hour, the solution is further stirred for 1 hour and mixed with 100 parts methanol and 50 parts ice. After suction-filtration, washing and re-dissolving from 50 parts boiling pyridine, there are obtained 5.6 parts 1-hydroxy-4-anilino-2-carbethoxy-oxy-anthraquinone of melting point 155–156° C.

100 parts polyester fibres (polyethylene terephthalate) are dyed in 3000 parts water for one hour at 125–130° C. under pressure with one part of the above dyestuff previously converted into a finely divided state. A clear violet dyeing of very good fastness properties is obtained.

EXAMPLES 69–84

The dyestuffs set out in Table V are obtained in the same manner as that described in Examples 65 to 68 with the use of the appropriate starting materials and yield the specified shades on polyester material.

TABLE V

| Example | Dyestuff | Shade |
|---|---|---|
| 69 | 1-hydroxy-4-p-anisidino-2-acetyloxy-anthraquinone. | Reddish-blue. |
| 70 | 1-hydroxy-4-p-anisidino-2-butyryloxy-anthraquinone. | Do. |
| 71 | 1-hydroxy-4-anilino-2-benzoyloxy-anthraquinone. | Blue-violet. |
| 72 | 1-hydroxy-4-anilino-2-(p-chlorobenzoyl-oxy)-anthraquinone. | Do. |
| 73 | 1-hydroxy-4-anilino-2-carbomethoxyoxy-anthraquinone. | Do. |
| 74 | 1-hydroxy-4-cyclohexylamino-2-propionyl-oxy-anthraquinone. | Violet. |
| 75 | 1-hydroxy-4-p-toluidino-2-benzoyloxy-anthraquinone. | Blue-violet. |
| 76 | 1-hydroxy-4-p-toluidino-2-propionyloxy-anthraquinone. | Do. |
| 77 | 1-amino-4-thiophenoxy-2-acetyloxy-anthraquinone. | Bluish-red. |
| 78 | 1-amino-4-(o-methylthiophenoxy)-2-propionyloxy-anthraquinone. | Do. |
| 79 | 1-hydroxy-5,8-bis-p-toluidino-2-benzoyl-oxy-anthraquinone. | Green. |
| 80 | 1-hydroxy-5,8-bis-p-toluidino-2-acetyloxy-anthraquinone. | Do. |
| 81 | 1,5-dihydroxy-4,8-diamino-2-(p-chloro-benzoyloxy)-anthraquinone. | Blue. |
| 82 | 1,5-dihydroxy-4,8-diamino-2-butyryloxy-anthraquinone. | Do. |
| 83 | 1,5-dihydroxy-4,8-diamino-2-benzoyloxy-anthraquinone. | Do. |
| 84 | 1,5-dihydroxy-4,8-diamino-6-(p-methoxy-phenyl)-2-benzoyloxy-anthraquinone. | Do. |

200 parts of a fabric of acetate rayon are dyed in 6000 parts water for one hour at 75° C., in the presence of 10 parts Marseille soap, with a mixture of one part each of the dyestuffs obtained according to Example 51 and Example 83. A blue dyeing of good fastness to light and washing is obtained.

EXAMPLE 85

4.5 parts 1-amino-2-hydroxy-p-toluidino-anthraquinone are dissolved in 50 parts pyridine and mixed with 2.5 parts triethylamine. 2.5 parts p-chlorobenzene-sulphochloride in 5 parts pyridine are added dropwise at 0° C. in the course of 30 minutes. The reaction mixture is subsequently stirred at 0° C. for a further half hour, 100 parts methanol and 50 parts water are added, and the precipitated crystals are filtered off with suction. After washing with methanol and water there are obtained 6.4 parts 1-amino - 4 - p - toluidino - 2 - (p-chlorobenzene-sulphonyloxy)-anthraquinone which, after recrystallisations from pyridine, melts at 154 to 155° C.

100 parts polyester fibers (polyethylene terephthalate) are dyed in 4000 parts water at boiling temperature for 120 minutes in the presence of o-cresotic acid methyl ester as carrier, with one part of the above dyestuff previously converted into a finely divided state by the usual methods. An intense greenish-blue dyeing of very good fastness to sublimation is obtained.

EXAMPLE 86

3.5 parts 1-amino-2-hydroxy-4-cyclohexylamino-anthraquinone are dissolved in 40 parts anhydrous pyridine. After the addition of 1.8 parts triethylamine, 2.5 parts 2-chlorobenzothiazole sulphochloride, dissolved in 5 parts pyridine, are added dropwise at 0° C. over 5 minutes. The reaction mixture is subsequently stirred at the same temperature for 30 minutes, 55 parts methanol and 15 parts water are added dropwise and the product if filtered off with suction. After washing it with a mixture of equal parts water and methanol and drying, 4.8 parts 1-amino-2-(2'-chlorobenzothiazolesulphonyloxy) - 4 - cyclohexylamino-anthraquinone are obtained.

100 parts polyester fibres (polyethylene terephthalate) are dyed in 3000 parts water at 125 to 130° C. under pressure for one hour with one part of the above dyestuff previously converted into a finely divided state by the usual methods. A clear blue dyeing of very good fastness to sublimation is obtained.

EXAMPLES 87–96

The dyestuffs set out in Table VI are obtained as described in Examples 85 and 86 with the use of the appropriate starting materials and yield the specified shades on polyester material.

TABLE VI

| Example | Dyestuff | Shade |
| --- | --- | --- |
| 87 | 1-amino-4-anilino-2-p-tosyloxyanthraquinone. | Blue. |
| 88 | 1-amino-4-p-anisidino-2-benzene-sulphonyloxy-anthraquinone. | Greenish-blue. |
| 89 | 1-amino-4-p-anisidino-2-(N,N-dimethyl-amino-sulphonyloxy)-anthraquinone. | Do. |
| 90 | 1-amino-4-p-toluidino-2-p-tosyloxyanthraquinone. | Blue. |
| 91 | 1-amino-4-(m-chloranilino)-2-p-tosyloxy-anthraquinone. | Do. |
| 92 | 1-amino-4-(p-chloranilino)-2-p-tosyloxy-anthraquinone. | Do. |
| 93 | 1-amino-4-hexahydroanilino-2-p-tosyloxy-anthraquinone. | Do. |
| 94 | 1-amino-4-hexahydroaniliuo-2-(1'-naphthalene-sulphonyloxy)-anthraquinone. | Do. |
| 95 | 1-amino-4-hexahydroanilino-2-(2'-naphthalene-sulphonyloxy)-anthraquinone. | Do. |
| 96 | 1,N,N-dimethylamino-4-anilino-2-p-tosyloxy-anthraquinone. | Greenish-blue. |

EXAMPLE 97

5 parts 1,4-diamino-2-hydroxy-anthraquinone are dissolved in 50 parts pyridine, mixed with 2 parts triethylamine and reacted at 0° C. over a half hour with a solution of 3 parts p-tosylchloride in 5 parts pyridine. 30 parts methanol and 30 parts water are added after a further half hour and the precipitated crystals are filtered off with suction, washed with methanol and water and dried. There are obtained 7.5 parts 1,4-diamino-2-p-tosyloxy-anthraquinone which, after recrystallisation from pyridine, melts at 214 to 215° C.

100 parts polyester fibres (polyethylene terephthalate) are dyed in 3000 parts water at 125 to 130° C. under pressure for one hour with one part of the above dyestuff previously converted into a finely divided state by usual methods. An intense violet dyeing of very good fastness properties is obtained.

EXAMPLES 98–101

The dyestuffs set out in Table VII are prepared in analogous manner to that described in Example 97. They yield the specified shades on polyester materials.

TABLE VII

| Example | Dyestuff | Shade |
| --- | --- | --- |
| 98 | 1,4-diamino-2-(p-chlorobenzene-sulphonyloxy)-anthraquinone. | Violet. |
| 99 | 1,4-diamino-2-benzene-sulphonyloxy-anthraquinone. | Do. |
| 100 | 1,4-diamino-2-mesyloxy-anthraquinone. | Do. |
| 101 | 1,4-diamino-2-(N,N-dimethylamino-sulphonyloxy)-anthraquinone. | Do. |

EXAMPLE 102

(a) 9 parts 1,2-dihydroxy-4,8-diamino-anthraquinone are dissolved in a mixture of 90 parts and 4.3 parts triethylamine. 7 parts p-tosylchloride, dissolved in 10 parts pyridine, are then added at 0° C. over 45 minutes, the solution is stirred at 0° C. for 30 minutes and the reaction product is precipitated with 70 parts methanol and 70 parts water and dried. 13.5 parts 1-hydroxy-4,8-di-after recrystallisation from pyridine, melts at 244 to 245° C.

100 parts polyester fibres (polyethylene terephthalate) are dyed in 3000 parts water at 125 to 130° C. under pressure for 1 hour with one part of the above dyestuff previously converted into a finely divided state. An intense red-violet dyeing of very good fastness properties is obtained.

(b) In the same manner as that described above, there are obtained from 1,4,8-triamine-2-hydroxy-anthraquinone, the 1,4,8-triamino-2-p-tosyloxy-anthraquinone which, after recrystallisation from pyridine, melts at 221 to 222° C. and yields on polyester fibres an intense blue-violet shade of very good fastness properties.

EXAMPLE 103

8 parts 1,6-dihydroxy-4,5,8-triamino-anthraquinone are mixed in 60 parts pyridine in the presence of 3.6 parts triethylamine and at 0° C. over one hour with a solution of 4 parts p-tosylchloride in 6 parts pyridine. After the addition of 80 parts methanol and 10 parts water, the crystalline precipitate is filtered off under suction and washed with methanol and water. There are obtained 10.5 parts 1-hydroxy-4,5,8-triamino-6-p-tosyloxy-anthraquinone which, after recrystallisation from pyridine, melts at 229 to 231° C.

100 parts polyester fibres (polyethylene terephthalate) are dyed in 3000 parts water at 125 to 130° C. under pressure for one hour with one part of the above dyestuff previously converted into a finely divided state by the usual methods. A clear greenish-blue dyeing of very good fastness to sublimation is obtained.

The dyestuffs set out in Table VIII are prepared in the same manner as that described above. They yield on polyester fibres the specified shades.

TABLE VIII

| Example | Dyestuff | Shade |
| --- | --- | --- |
| 104 | 1-hydroxy-4,5,8-triamino-6-benzene-sulphonyloxy-anthraquinone. | Greenish-blue. |
| 105 | 1-hydroxy-4,5,8-triamino-6-(p-chloro-benzene-sulphonyloxy)-anthraquinone. | Do. |
| 106 | 1-hydroxy-4,5,8-triamino-6-(N,N-di-methylamino-sulphonyloxy-anthraquinone. | Do. |

We claim:
1. Anthraquinone dyestuff which contains from 2 to 4 auxochromes in the apha-position and an acyloxy group in the beta-position wherein the alpha and beta-positions of the anthraquinone nucleus which do not contain auxochromes or an acyloxy group contain a member selected from the group consisting of hydrogen, bromine, chlorine, and methoxy phenyl; said auxochromes being selected from the group consisting of hydroxy, amino, alkylamino, phenylamino, substituted phenylamino, acylamino, cyclohexylamino, and phenyl mercapto wherein the substituted phenyl groups in said auxochromes contain substituents selected from the group consisting of halogen, hydroxy, alkyl, alkoxy, and alkylsulfonyloxy group and wherein the alkyl groups in said auxochromes contain from 1 to 6 carbon atoms; said acyloxy group being selected from the group consisting of alkylsulfonyloxy, beta-chloroethylsulfonyloxy, benzenesulfonyloxy, substituted benzenesulfonyloxy, naphthalenesulfonyloxy, benzylsulfonyloxy, and N,N-dialkylaminosulfonyloxy wherein the substituents of said benzenesulfonyloxy group are selected from the group consisting of methyl, chloro, or nitro groups and wherein the alkyl groups in said acyloxy group contain from 1 to 6 carbon atoms, with the proviso that at least one auxochrome in the alpha-position is amino, alkylamino, phenylamino, substituted phenylamino, acylamino, phenylmercapto, and cyclohexylamino.

2. The dyestuff of claim 1 of the formula

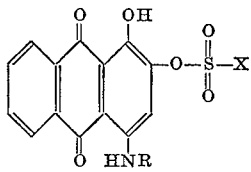

wherein X is selected from the group consisting of alkyl, dialkylamino, phenyl, benzyl, naphthyl, and substituted phenyl wherein the substituents are selected from the group consisting of chloro, methyl, and nitro groups wherein NHR is an auxochrome the R being selected from the group consisting of hydrogen, alkyl, phenyl or substituted phenyl wherein the substituents are selected from the group consisting of hydroxy, halogen, alkyl, alkoxy or alkylsulphonyloxy groups and wherein the alkyl groups of said members X and R contain from 1 to 6 carbon atoms.

3. The dyestuff of claim 1 of the formula

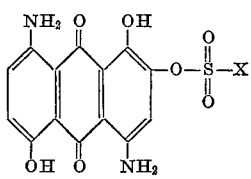

wherein X is selected from the group consisting of alkyl, dialkylamino, phenyl, benzyl, naphthyl, and substituted phenyl wherein the substituents are selected from the group consisting of methyl, chloro, and nitro groups and wherein the alkyl groups contain from 1 to 6 carbon atoms.

4. The anthraquinone dyestuff of claim 1 wherein the acyloxy group is selected from the group consisting of benzene sulfonyloxy, substituted benzene sulfonyloxy, naphthalene sulfonyloxy, and benzyl sulfonyloxy wherein the substituents on said benzene sulfonyloxy group are selected from the group consisting of methyl, chloro, or nitro groups.

5. The dyestuff of claim 1 of the formula

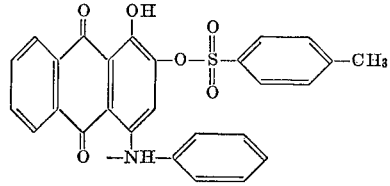

6. The dyestuff of claim 1 of the formula

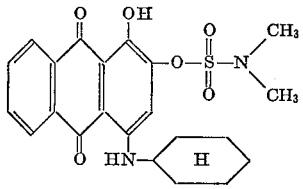

7. The dyestuff of claim 1 of the formula

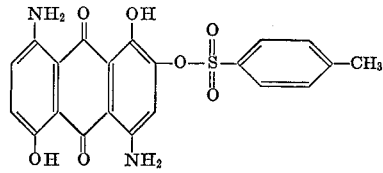

8. The anthraquinone dyestuff of claim 1 wherein the auxochromes are selected from the group consisting of phenylamino, acylamino and cyclohexylamino wherein the alkyl groups and substituents in the phenyl radical are as defined in claim 1.

9. An anthraquinone of the formula

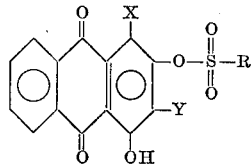

wherein
X is amino or an alkylamino having 1–3 carbon atoms;
R is lower alkyl, beta-chloroethyl, benzyl, phenyl, naphthyl or methyl-, nitro-, or chlorine-substituted phenyl; and
Y is hydrogen, chlorine or bromine.

References Cited

Perkiz et al. J. Chem. Soc., 1928, p. 241.

LORRAINE A. WEINBERGER, Primary Examiner

R. GERSTL, Assistant Examiner

U.S. Cl. X.R.

8—39, 40; 260—375, 380